United States Patent
Nakayama et al.

(10) Patent No.: US 9,906,086 B2
(45) Date of Patent: Feb. 27, 2018

(54) ROTATING ELECTRIC MACHINE INCLUDING A STATOR WITH A CONNECTION PORTION HAVING A CORNER PORTION AND METHOD FOR MANUFACTURING SAME

(71) Applicant: Hitachi Automotive Systems, Ltd., Hitachinaka-shi, Ibaraki (JP)

(72) Inventors: Kenichi Nakayama, Hitachinaka (JP); Tomohiro Fukuda, Hitachinaka (JP); Masamichi Kase, Hitachinaka (JP); Hiroshi Matahira, Tokyo (JP); Kazuo Ojima, Hitachinaka (JP); Dai Nakamura, Hitachinaka (JP); Shin Onose, Hitachinaka (JP); Mitsuaki Mirumachi, Hitachinaka (JP); Hisaya Shimizu, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 128 days.

(21) Appl. No.: 14/422,621

(22) PCT Filed: Jul. 29, 2013

(86) PCT No.: PCT/JP2013/070409
§ 371 (c)(1),
(2) Date: Feb. 19, 2015

(87) PCT Pub. No.: WO2014/034343
PCT Pub. Date: Mar. 6, 2014

(65) Prior Publication Data
US 2015/0222155 A1   Aug. 6, 2015

(30) Foreign Application Priority Data
Aug. 31, 2012   (JP) .................................. 2012-190814

(51) Int. Cl.
*H02K 3/04*   (2006.01)
*H02K 11/00*  (2016.01)
(Continued)

(52) U.S. Cl.
CPC ............... *H02K 3/28* (2013.01); *B23K 9/167* (2013.01); *B23K 10/02* (2013.01); *H02K 3/12* (2013.01);
(Continued)

(58) Field of Classification Search
CPC ........................................ H02K 3/00
(Continued)

(56) References Cited

U.S. PATENT DOCUMENTS

| 6,181,043 B1 | 1/2001 | Kusase et al. |
| 6,915,556 B2 * | 7/2005 | Lenoir ............... H02K 15/0056 219/125.11 |

(Continued)

FOREIGN PATENT DOCUMENTS

| JP | 9-215280 A | 8/1997 |
| JP | 2000-164043 A | 6/2000 |

(Continued)

OTHER PUBLICATIONS

International Search Report (PCT/ISA/210) dated Nov. 5, 2013 with English translation (five pages).

*Primary Examiner* — Jose Gonzalez Quinones
(74) *Attorney, Agent, or Firm* — Crowell & Moring LLP

(57) ABSTRACT

A rotating electric machine having downsized coil ends is provided. In a rotating electric machine having a stator 130 including a stator core 132 formed with a plurality of slots 420 rowed in a circumferential direction and a stator coil 138 inserted into the slots of the stator core, and a rotor 150 disposed rotatably with respect to the stator core with a clearance interposed therebetween. The stator coil is formed
(Continued)

by a plurality of segment coils 28 being connected, the segment coils 28 being made of a conductor shaped into a rough U-shape and having a rectangular cross-section. The segment coil has at an end a connection portion 800 connected to another segment coil, the connection portion having a corner portion 810.

5 Claims, 18 Drawing Sheets

(51) Int. Cl.
*H02K 3/00* (2006.01)
*H02K 3/28* (2006.01)
*H02K 3/12* (2006.01)
*H02K 15/00* (2006.01)
*B23K 9/167* (2006.01)
*B23K 10/02* (2006.01)

(52) U.S. Cl.
CPC ..... *H02K 15/0068* (2013.01); *H02K 15/0081* (2013.01); *Y10T 29/49009* (2015.01)

(58) Field of Classification Search
USPC .................................. 310/71, 198, 201, 208
See application file for complete search history.

(56) References Cited

U.S. PATENT DOCUMENTS

| | | |
|---|---|---|
| 2002/0041129 A1 | 4/2002 | Oohashi et al. |
| 2003/0127934 A1 | 7/2003 | Koike |
| 2005/0194857 A1 | 9/2005 | Mori et al. |
| 2011/0181143 A1* | 7/2011 | Hasegawa ................ H02K 3/38 310/180 |
| 2012/0133235 A1 | 5/2012 | Ogihara |

FOREIGN PATENT DOCUMENTS

| | | | |
|---|---|---|---|
| JP | 2000295821 A | * | 10/2000 |
| JP | 2001-54263 A | | 2/2001 |
| JP | 2002-119003 A | | 4/2002 |
| JP | 2002-204543 A | | 7/2002 |
| JP | 2005-253145 A | | 9/2005 |
| JP | 2009-81980 A | | 4/2009 |
| JP | 2010011710 A | * | 1/2010 |
| JP | 2011-151975 A | | 8/2011 |
| JP | 2012-115075 A | | 6/2012 |

* cited by examiner

ROTATING ELECTRIC MACHINE INCLUDING A STATOR WITH A CONNECTION PORTION HAVING A CORNER PORTION AND METHOD FOR MANUFACTURING SAME

TECHNICAL FIELD

The present invention relates to a rotating electric machine and a manufacturing method therefor.

BACKGROUND ART

Rotating electric machines generate a rotating magnetic field, while supplying AC power to a stator coil, and allow the rotating magnetic field to rotate a rotor. The rotating electric machines further convert mechanical energy applied to the rotor into electric energy and output AC power from the coil. Thus, the rotating electric machine can act as an electric motor or a generator.

An example of such a stator coil of the rotating electric machine described above is one formed by terminals of segment coils being welded and connected (refer to Patent Document 1, for instance).

PRIOR ART DOCUMENT

Patent Document

Patent Document 1: JP-2011-151975-A

SUMMARY OF THE INVENTION

Problem to be Solved by the Invention

In a case where a rotating electric machine of this type is mounted on an automobile, it will be attached in a narrow limited space. The rotating electric machine needs to be downsized. It will also be necessary to ensure a clearance between the upper portion of a coil end and a transmission portion. It will hence be preferable to reduce the height of the coil end in the welded portion of the segment coil. However, the rotating electric machine of this type has a problem in that the coil end will increase in size and project axially or radially.

Means for Solving the Problem

To solve the above problem, the configuration described in a claim, for example, is adopted. The present application includes a plurality of means for solving the above problem, but an example of the means is as below. A rotating electric machine comprises: a stator including a stator core formed with a plurality of slots rowed in a circumferential direction and a stator coil inserted into the slots of the stator core; and a rotor disposed rotatably with respect to the stator core with a clearance interposed therebetween. The rotating electric machine is configured such that the stator coil is formed by connecting together a plurality of segment coils, the segment coils being made of a conductor shaped into a rough U-shape and having a rectangular cross-section, the segment coil has at an end a connection portion connected to another segment coil, and the connection portion has a corner portion.

Advantages of the Invention

The present invention can provide the rotating electric machine that has downsized coil ends. Problems, configurations and effects other than those in the above description are explained in the description of the embodiments as below.

MODE FOR CARRYING OUT THE INVENTION

Embodiments of the present invention will hereinafter be described with reference to the drawings.

Overall Configuration of a Rotating Electric Machine

A rotating electric machine according to an embodiment of the present invention is one that is suitable for use in driving an automobile. The so-called electric vehicles using a rotating electric machine include a hybrid electric vehicle (HEV) having both an engine and a rotating electric machine, and a pure electric vehicle (EV) which runs only by means of a rotating electric machine without the use of an engine. The rotating electric machine described below can be used for both types. A description is here given of a rotating electric machine used for the hybrid automobile on behalf of both the types.

Figure 1:
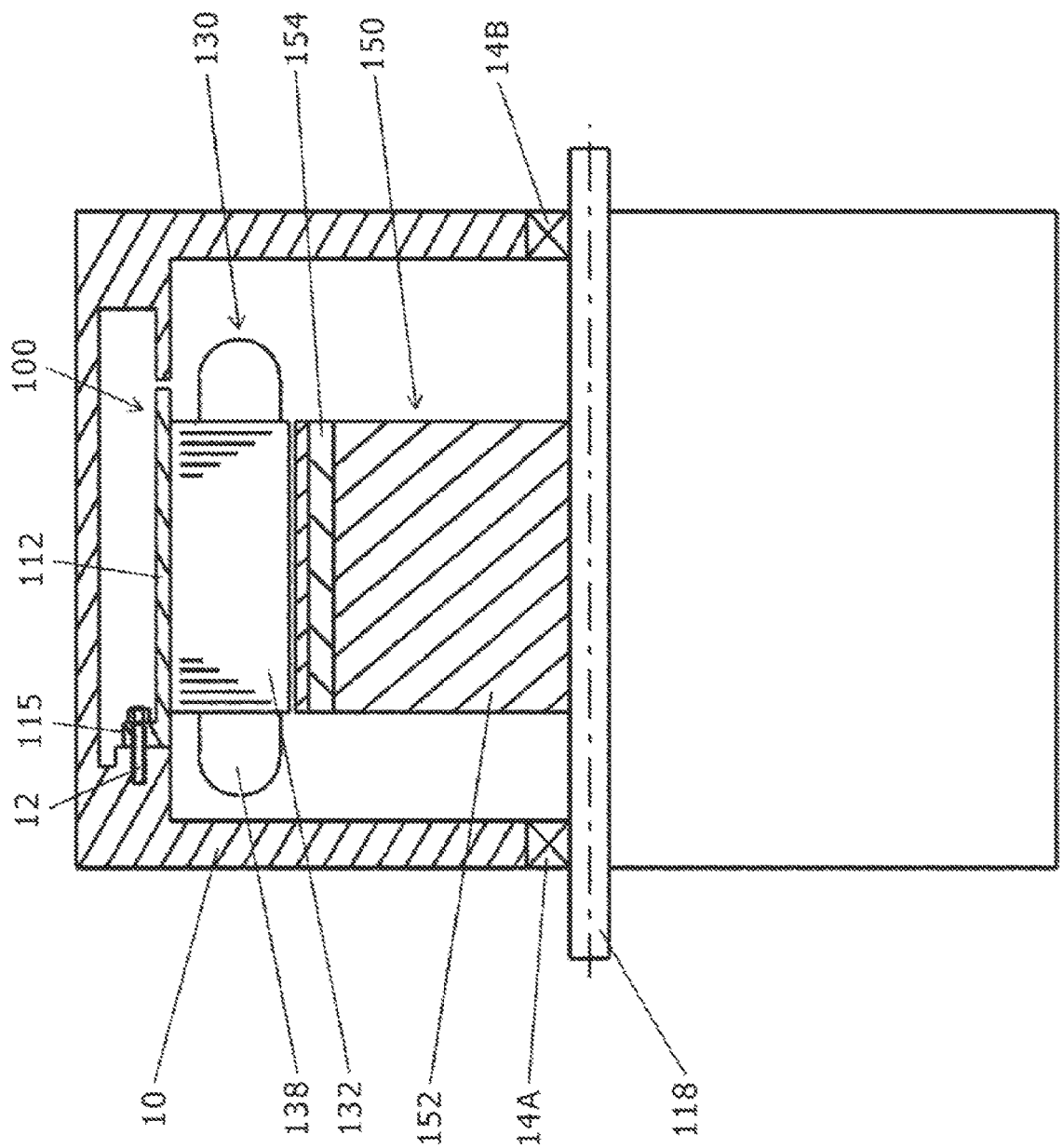
FIG. 1 is a schematic view illustrating the overall configuration of a rotating electric machine according to an embodiment of the present invention.

FIG. 1 is a schematic view illustrating the overall configuration of a rotating electric machine 100 according to the embodiment of the present invention. FIG. 1 is a partial cross-section view of the rotating electric machine 100 illustrating the inside of the rotating electric machine 100. The rotating electric machine 100 is disposed in a case 10 as shown in FIG. 1 and includes a housing 112, a stator 130 having a stator core 132 secured to the housing 112, and a rotor 150 disposed rotatably in the stator. The case 10 includes a case for an engine or another case for a transmission.

This rotating electric machine 100 is a three-phase synchronous motor of built-in permanent magnet. The rotating electric machine 100 acts as an electric motor, in which a three-phase AC current is supplied to the stator coil 138 wound around the stator core 132, to rotate the rotor 150. The rotating electric motor 100 is driven by an engine to serve as a generator to output three-phase AC power that has been generated. Specifically, the rotating electric machine 100 has both functions as an electric motor which generates rotary torque on the basis of electric energy and as a generator which generates electric power on the basis of mechanical energy. In addition, both the functions can selectively be used depending on the running condition of an automobile.

The stator 130 is secured to the housing 112. The stator 130 is fixedly held inside the case 10 by fastening a flange 115 provided on the housing 112 to the case 10 by means of bolts 12. The rotor 150 is secured to a shaft 118 by means of bearings 14A, 14B of the case 10 and is rotatably held inside the stator core 132.

Figure 2:
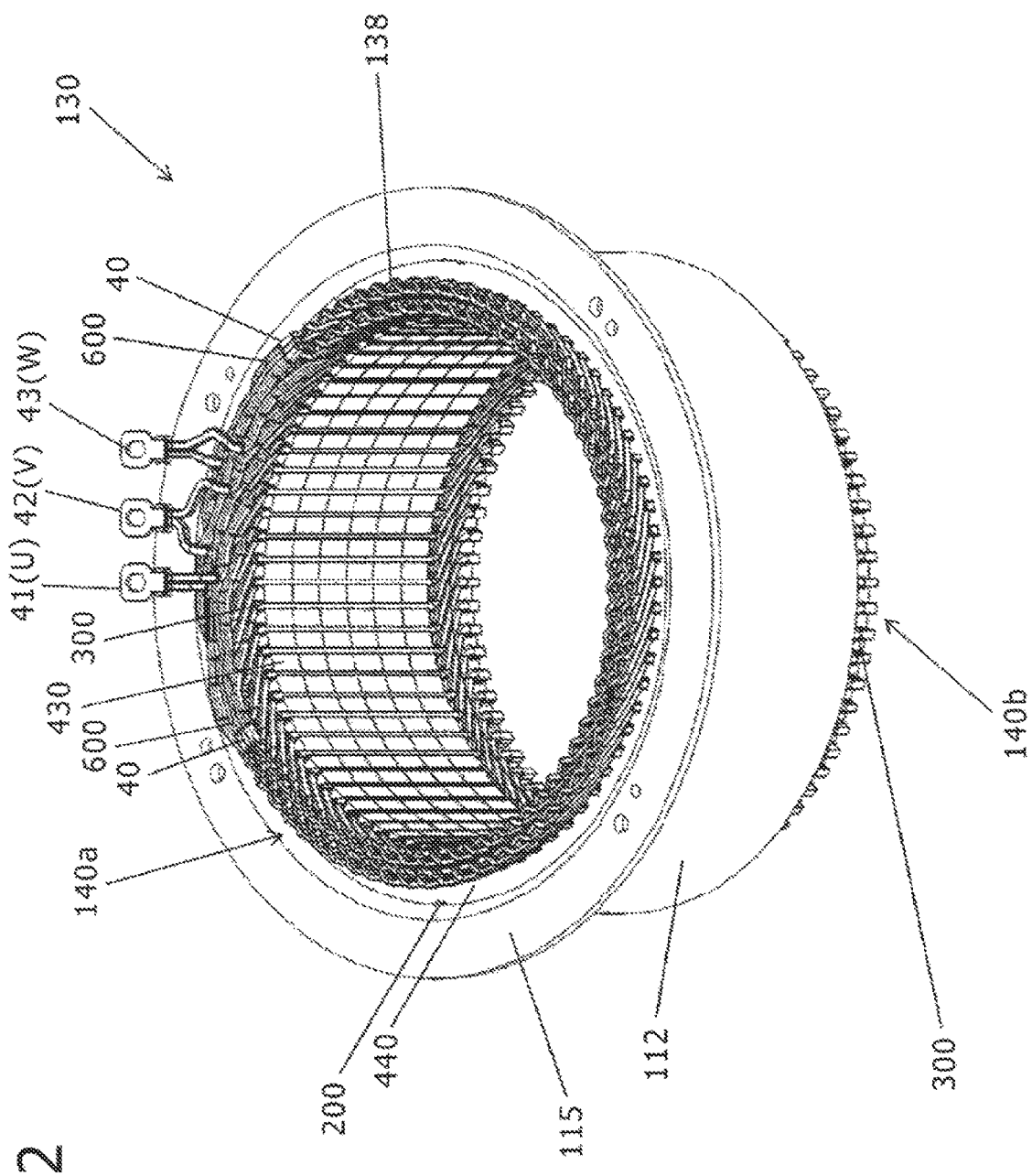
FIG. 2 is a perspective view of a stator of the rotating electric machine according to the embodiment of the present invention.

FIG. 2 is a perspective view of the stator 130 attached to the housing 112. The housing 112 is formed into a cylindrical shape by drawing a steel sheet (such as high-tension steel sheet) having a thickness of about 2 to 5 mm. The flange 115 is provided at axial one end of the housing 112 and is secured to the case 10 by means of the bolts as described above (see FIG. 1). It should be noted that the stator 130 may be directly secured to the case 10 without the provision of the housing 112.

Figure 3:
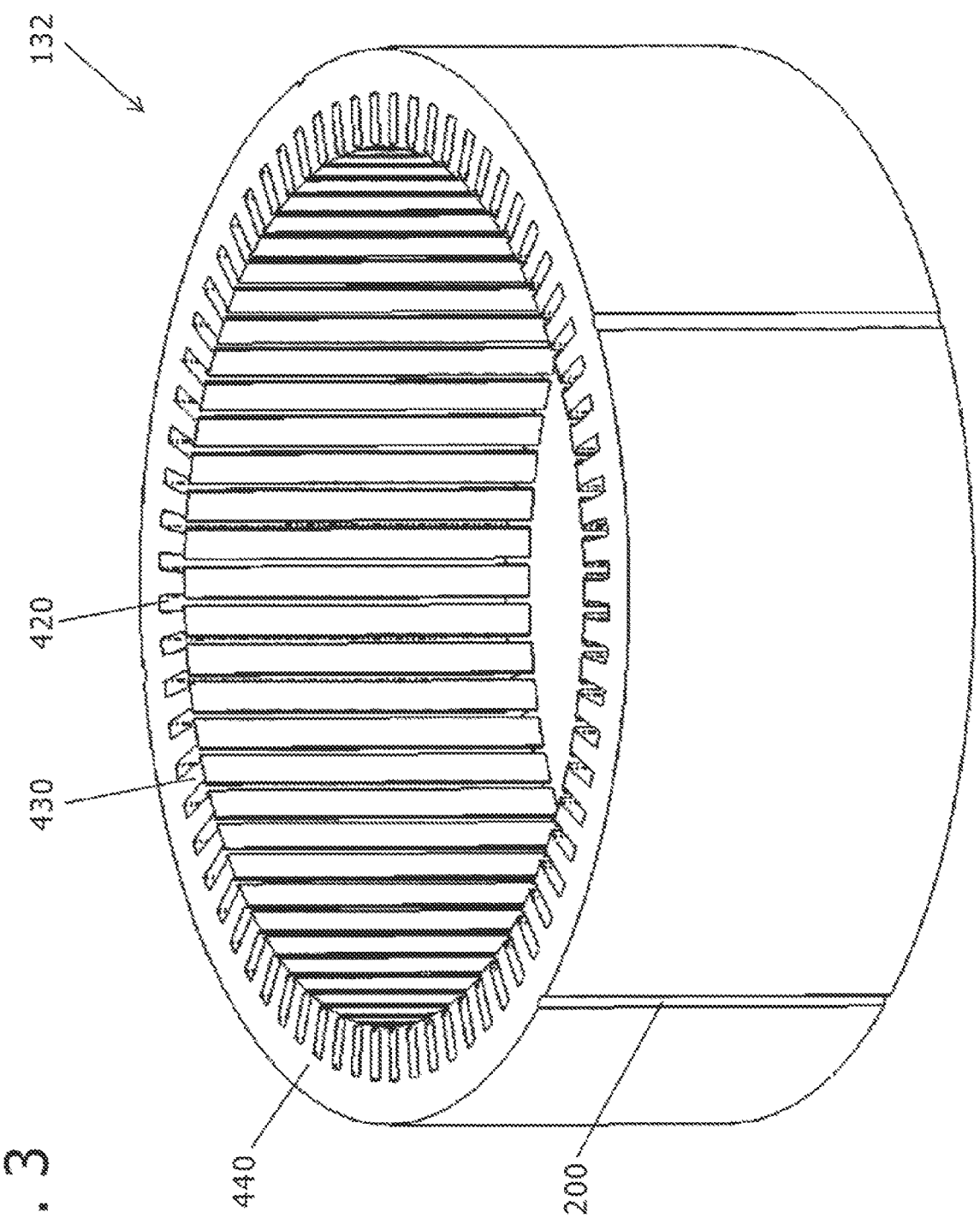
FIG. 3 is a perspective view of a stator core 132.
Figure 4:
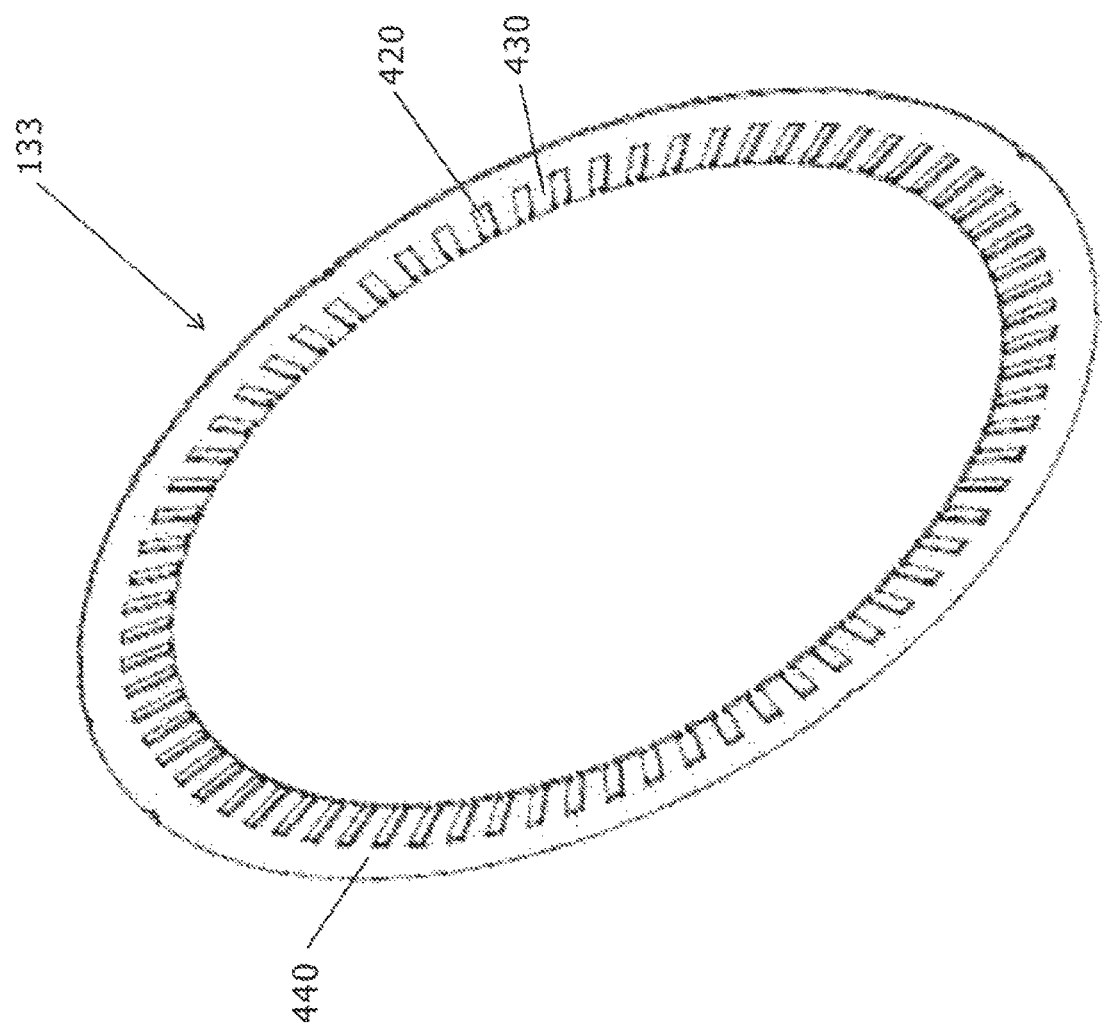
FIG. 4 illustrates an electromagnetic steel sheet 133.

The stator 130 is secured to the inner circumferential side of the housing 112. The stator 130 includes the cylindrical stator core 132 and the stator coil 138 attached to the stator core 132. FIG. 3 is a perspective view of the stator core 132. The stator core 132 is formed by a plurality of the electromagnetic steel sheets 133 being laminated as illustrated in FIG. 4. The electromagnetic steel sheet 133 has a thickness of about 0.05 to 1.0 mm and is formed through punching or etching. The laminated electromagnetic steel sheets 133 are secured to one another by way of welding. The secured portions of the laminated electromagnetic steel sheets 133 are shown as welded portions 200 in an example shown in FIG. 3. This welding connects the laminated electromagnetic steel sheets 133 together and also restrains the deformation of the electromagnetic steel sheets 133 resulting from tightening force occurring when the electromagnetic steel sheets 133 are press fitted into the housing 112.

The stator core 132 is formed with a plurality of axially extending slots 420 arranged at equally-spaced intervals in a circumferential direction. The number of the slots 420 is, e.g., 72 in the present embodiment. The stator coils 138 are received in the slots 420 as illustrated in FIG. 2. In an example illustrated in FIG. 3, the slot 420 is an open slot and its opening is formed on the inner circumferential side of the stator core. This opening has a circumferential width roughly equal to or slightly smaller than that of a coil attachment portion of each of the slots 420 to which the stator coil 138 is attached.

It should be noted that an insulating paper 300 is disposed in each of the slots 420. The insulating paper 300 is disposed in each of the slots 420 and at each of coil ends 140a, 140b. The insulating paper 300 (i.e., a slot liner) is disposed in the slot 420, that is, disposed between the coils inserted into the slots 420 and between the coil and the inner surface of the slot 420. In this way, it is intended to increase dielectric strength voltage between the coils and between the coil and the inner surface of the slot 420.

The insulating paper 300 disposed at each of the coil ends 140a, 140b is annularly disposed between the coils for inter-phase insulation and for inter-conductor insulation at the coil ends 140a, 140b. As described above, the rotating electric machine 100 according to the present embodiment is such that the insulating paper 300 is disposed on the inside of the slot 420 and at the coil ends 140a, 140b. Therefore, even if an insulating coat 600 for the coil is damaged or deteriorated, necessary dielectric strength voltage could be maintained. It should be noted that the insulating paper 300 is, for example, an insulating sheet made of heat-resistant polyamide paper and has a thickness of about 0.1 to 0.5 mm.

A tooth 430 is formed between the slots 420 and is integral with an annular core back 440. The stator core 132 is formed as an integral core in which the teeth 430 and the core back 440 are integrally formed. The teeth 430 acts to lead the rotating magnetic field generated by the stator coil 130 to the rotor 150 to allow the rotor 150 to generate rotary torque.

The stator core 132 illustrated in FIG. 3 is fixedly fitted to the inside of the above-mentioned cylindrical housing 112 by means of thermal insert. A specific assembling method involves, for example, first disposing the stator core 132 and fitting to the stator core 132 the housing 112 which has previously been heated to increase the inside diameter thereof through thermal expansion. Next, the housing 112 is cooled to reduce its inside diameter, thereby tightening the outer circumferential portion of the stator core 132 through such thermal shrinkage.

The inside diameter of the housing 112 is set so as to be smaller than the outside diameter of the stator core 132 by a predetermined value so that the stator core 132 may not run idle with respect to the housing 112 due to reaction resulting from the torque of the rotor 150 during operation. As a result, the stator core 132 is firmly secured to the inside of the housing though thermal insert. A difference between the outside diameter of the stator core 132 and the inside diameter of the housing 112 at room temperature is called a tightening margin. This tightening margin is set with assumption of the maximum torque of the rotating electric machine 100. In this way, the housing 112 can hold the stator core 132 with a predetermined tightening force. It should be noted that the stator core 132 is not limited to the case of being fixedly fitted to the housing 112 through the thermal insert. The stator core 132 may be fixedly fitted to the housing 112 with press fitting.

Figure 5:
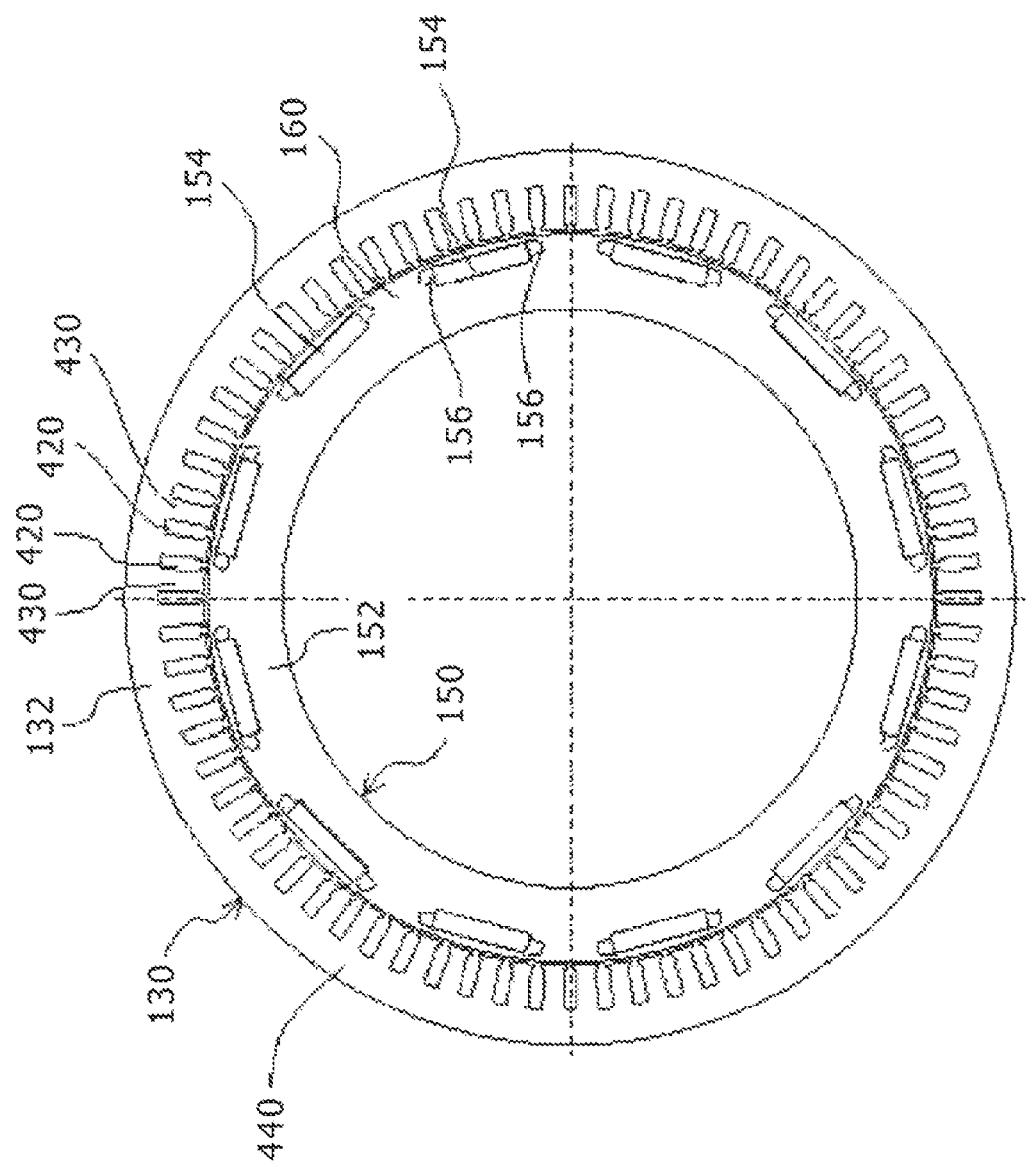
FIG. 5 is a cross-section view of a rotor 150 and a stator 130.

FIG. 5 is an explanatory view of the rotor 150, illustrating the cross-sections of the rotor 150 and the stator 130. It should be noted that, to avoid complication, the shaft 118, and the stator coils 138 and the insulating papers 300 received inside the slots 420 are omitted. As illustrated in FIG. 5, the stator 150 includes the stator core 152 and permanent magnets 154 held in magnet insertion holes formed in the rotor core 152.

The stator core 152 is formed with the magnet insertion holes each shaped in a rectangular parallelepiped at circumferentially regular intervals. The permanent magnets 154 are embedded into the corresponding magnet insertion holes and secured thereto with an adhesive or the like. The magnet insertion hole is formed to have a circumferential width greater than that of the permanent magnet 154. A magnetic air gap 156 is defined at both sides of the permanent magnet 154. The magnetic air gap 156 may be filled with an adhesive. Alternatively, the magnetic air gap 154 may be filled with a resin integrally with the permanent magnet 154.

The permanent magnets 154 are adapted to create the field poles of the rotor 150. It should be noted the present embodiment is configured such that one permanent magnet 154 creates one magnetic pole. However, a plurality of the permanent magnets may create one magnetic pole. Increasing the number of the permanent magnet for creating each magnetic pole makes the magnetic flux density of each magnetic pole emitted by the permanent magnet higher, thereby making it possible to escalate the magnet torque.

The magnetization direction of the permanent magnet 154 is oriented in the radial direction. The orientation of the magnetization direction is reversed for each field pole. More specifically, in a case where it is assumed that a stator-side surface of the permanent magnet 154 to create a certain magnetic pole is magnetized into a N-pole and the shaft-side surface thereof is magnetized into a S-pole, a stator-side surface of a permanent magnet 154 creating an adjacent magnetic pole would be magnetized into a S-pole and a shaft-side surface would be magnetized into a N-pole. In the present embodiment, twelve permanent magnets 154 are arranged at circumferentially regular intervals and magnetized such that their magnetization directions are alternately changed for each magnetic pole. Consequently, the rotor 150 creates twelve magnetic poles.

It should be noted that the permanent magnet 154 that has been magnetized may be embedded in the magnet insertion hole of the rotor core 152. Alternatively, the permanent magnet 154 before being magnetized may be inserted into the magnet insertion hole and then magnetized by being subjected to a strong magnetic field.

However, the permanent magnet 154 that has been magnetized has a strong magnetic force. In a case where a magnet is magnetized before the permanent magnet 154 is secured to the rotor 150, a strong attractive force would occur between the rotor core 154 and the permanent magnet 154 when the permanent magnet 154 is secured. This attractive force would obstruct work. In addition, due to the strong attractive force, dust such as iron powder may be likely to adhere to the permanent magnet 154. It is more preferable, therefore, to magnetize the permanent magnet 154 that has been inserted into the magnet insertion hole of the rotor core 152 in view of improving the productivity of the rotating electric machine 100. It is here noted that a neodymium- or samarium-based sintered magnet, a ferrite magnet, a neodymium-based magnet or the like can be used for the permanent magnet 154. Preferably, the permanent magnet 154 should have a residual flux density of approximately 0.4 to 1.3 T. A neodymium-based magnet is more suitable for the permanent magnet 154.

In the present embodiment, an auxiliary magnetic pole 160 is formed between the respective permanent magnets 154 which create magnetic poles. The auxiliary magnetic pole 160 operates to reduce the magnetic resistance of q-axis magnetic flux generated by the stator coil 138. This auxiliary magnetic pole 160 makes the magnetic resistance of the q-axis magnetic flux significantly smaller than that of the d-axis magnetic flux. Large reluctance torque will consequently occur.

When a three-phase alternate current is supplied to the stator coil 138, a rotating magnetic field occurs in the stator 130. This rotating magnetic field acts on the permanent magnet 154 of the rotor 150 to generate magnet torque. In addition to this magnet torque, the above-mentioned reluctance torque occurs in the rotor 150. Both torques, the above-mentioned magnetic torque and reluctant torque, serve as rotary torque on the rotor 150. Thus, large rotary torque can be obtained.

Explanation of the Stator Coil

Figure 6:
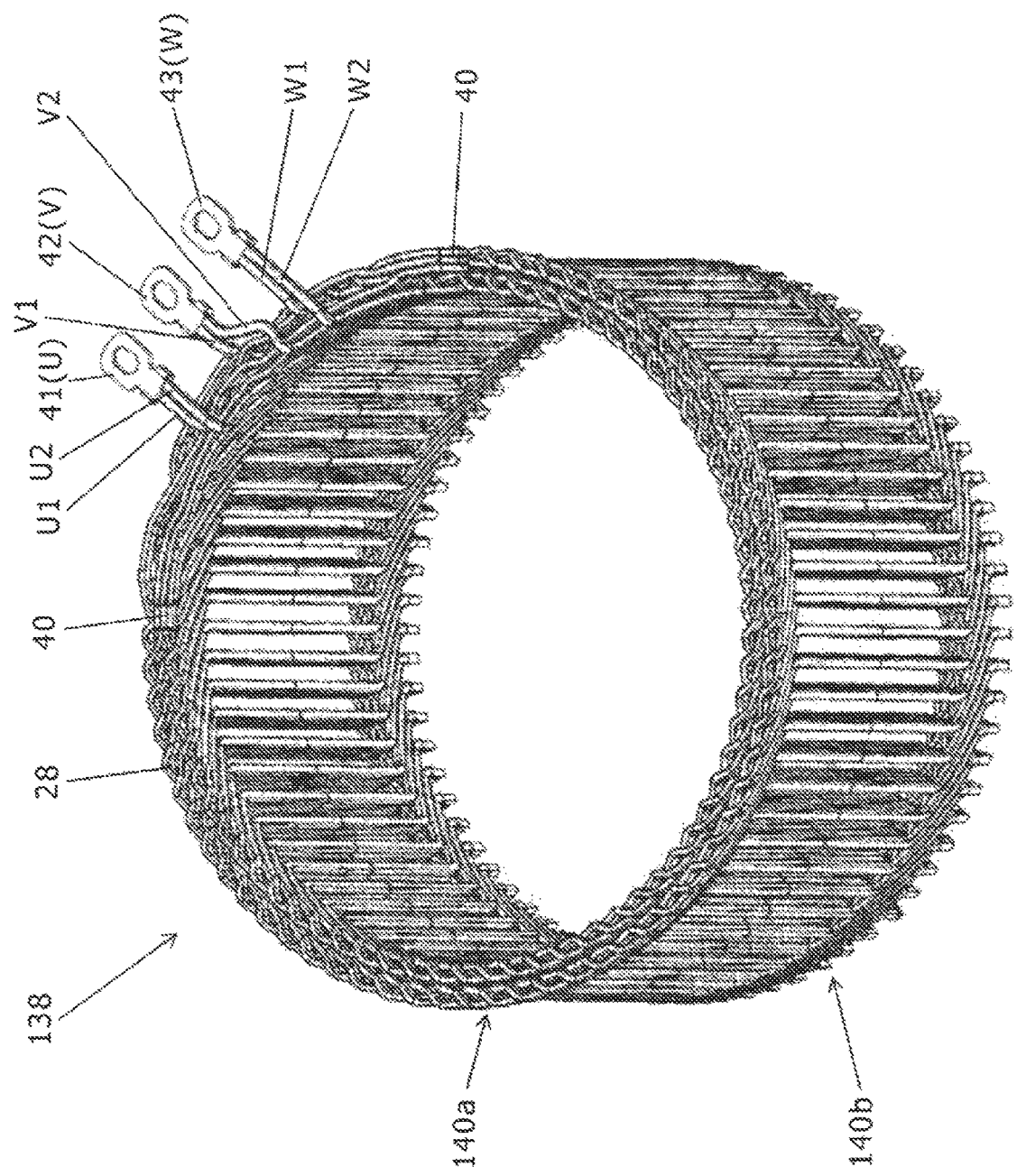
FIG. 6 is a perspective view of a stator coil 138.
Figure 7:
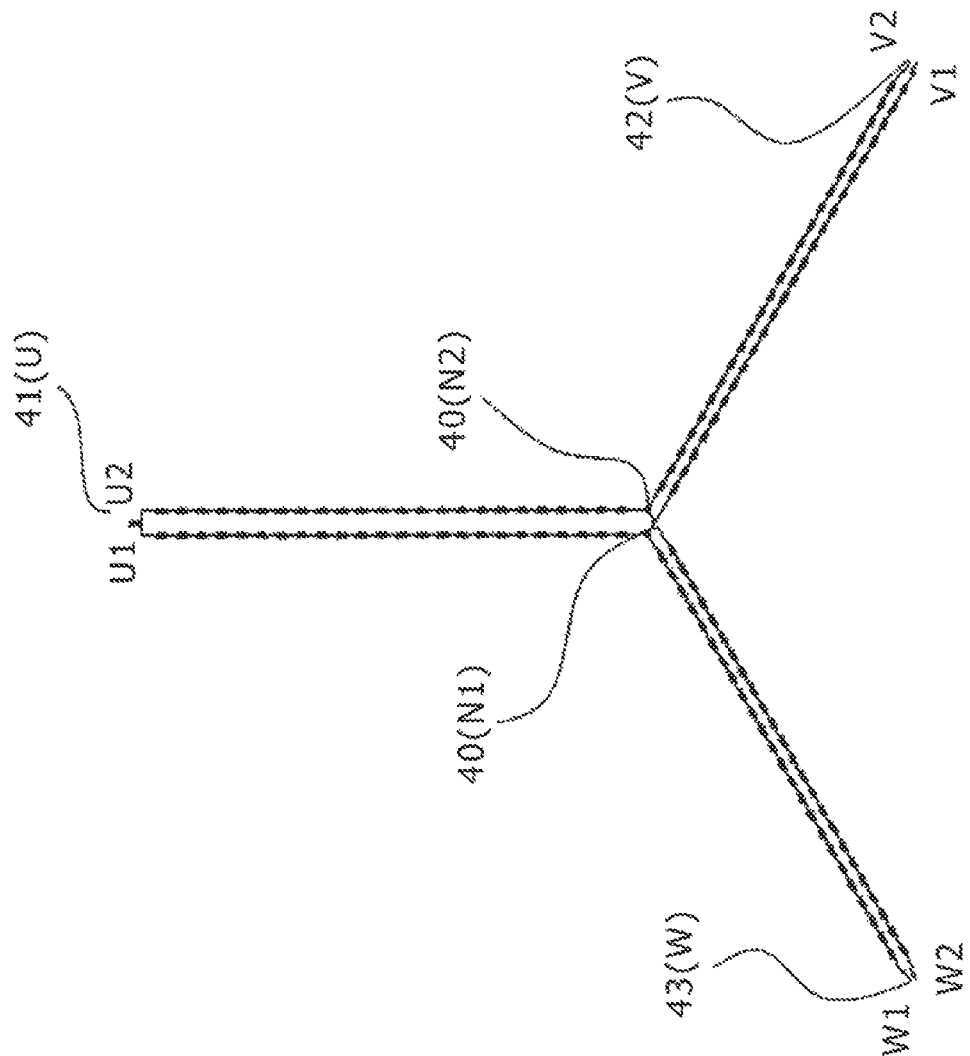
FIG. 7 illustrates a star connection.

FIG. 6 is a perspective view of the stator coil 138 for three phases. The stator coil 138 is connected to have such a configuration as a star connection as illustrated in FIG. 7. The present embodiment employs the stator coil 138 having a two-star connection in which two star connections are connected in parallel. More specifically, the stator coil 138 includes a star connection having a U1 phase, a V1 phase and a W1 phase and another star connection having a U2 phase, a V2 phase and a W2 phase. Lead lines of the U1 and U2 phases are assembled into one lead line with an AC terminal 41U. Lead lines of the V1 and V2 are assembled into one lead line with an AC terminal 41V. Lead lines of the W1 and W2 are assembled into one lead line with an AC terminal 41W. Symbols N1 and N2 denote respective neutral points of the star connections.

Oxygen-free copper or aerobic copper is used for the stator coil 138. The aerobic copper, for example, has an oxygen content of about 10 ppm to 1,000 ppm.

The stator coil 138 is wound with a distributed winding method. The distributed winding is a winding method in which phase winding coils are wound around the stator core 132 so that they can be received in two slots 420 which are spaced apart from each other with a plurality of slots 420 interposed therebetween. Adopting the distributed winding as a winding method, the present embodiment has a feature in which the magnetic flux distribution thus formed is closer to a sine curve than concentrated winding, and hence reluctance torque tends to occur. Therefore, the rotating electric machine 100 improves the controllability of field-weakening control and of control which makes use of reluctance torque. In addition, the rotating electric machine 100 can be used in a wide range of rotating speed from low rotating speed to high rotating speed. Thus, the rotating electric machine 100 can provide superior motor characteristics suitable for electric vehicles.

The stator coil 138 may have a circular or quadrangular shape in cross-section. However, effectively utilizing the cross-section of the inside of the slot 420 is as much as possible and having such a structure as to reduce the space inside the slot tend to improve efficiency. The quadrangular shape in cross-section is thus preferable in view of higher efficiency. It should be noted that the quadrangular shape of the cross-section of the stator coil 138 may be short in the circumferential direction of the stator core 132 and long in the radial direction. Alternatively, the quadrangular shape may be long in the circumferential direction and short in the radial direction. The present embodiment uses a rectangular coil as the stator coil 138 in which a rectangular cross-section thereof in each slot 420 is long in the circumferential direction of the stator coil 132 and short in the radial direction thereof. Moreover, the rectangular coil has an outer circumference covered by an insulating coat 600.

The stator coil 138 illustrated in FIG. 6 is such that coils of six systems (U1, U2, V1, V2, W1 and W2) in total are in close contact with and attached to the stator core 132 as illustrated in FIG. 2. The coils of six systems constituting the stator coil 138 are arranged at mutually appropriate intervals by means of the slots 420. As illustrated in FIG. 6, AC terminals 41U, 41V and 41W, which are respectively input-output terminals for three U-, V- and W-phases, and a neutral line connecting portion 40 are arranged on the side of the coil end 140a of the stator coil 138.

It should be noted that to improve workability in the assembly of the rotating electric machine 100, the AC terminals 41U, 41V and 41W for receiving three-phase AC power are arranged so as to project from the coil end 140a outward in the axial direction of the stator core 132. The stator 130 is connected to a power converter (not shown) via the AC terminals 41U, 41V, and 41W. Consequently, the AC power is supplied to the stator 130.

As illustrated in FIGS. 2 and 6, the coil ends 140a, 140b, projecting from the stator core 132 outward in the axial direction, are arranged in an orderly manner as a whole. This arrangement leads to downsizing of the overall rotating electric machine. In addition, the orderly arrangement of the coil ends 140a, 140b is desirable in view of higher reliability with respect to insulating characteristics.

Figure 8:
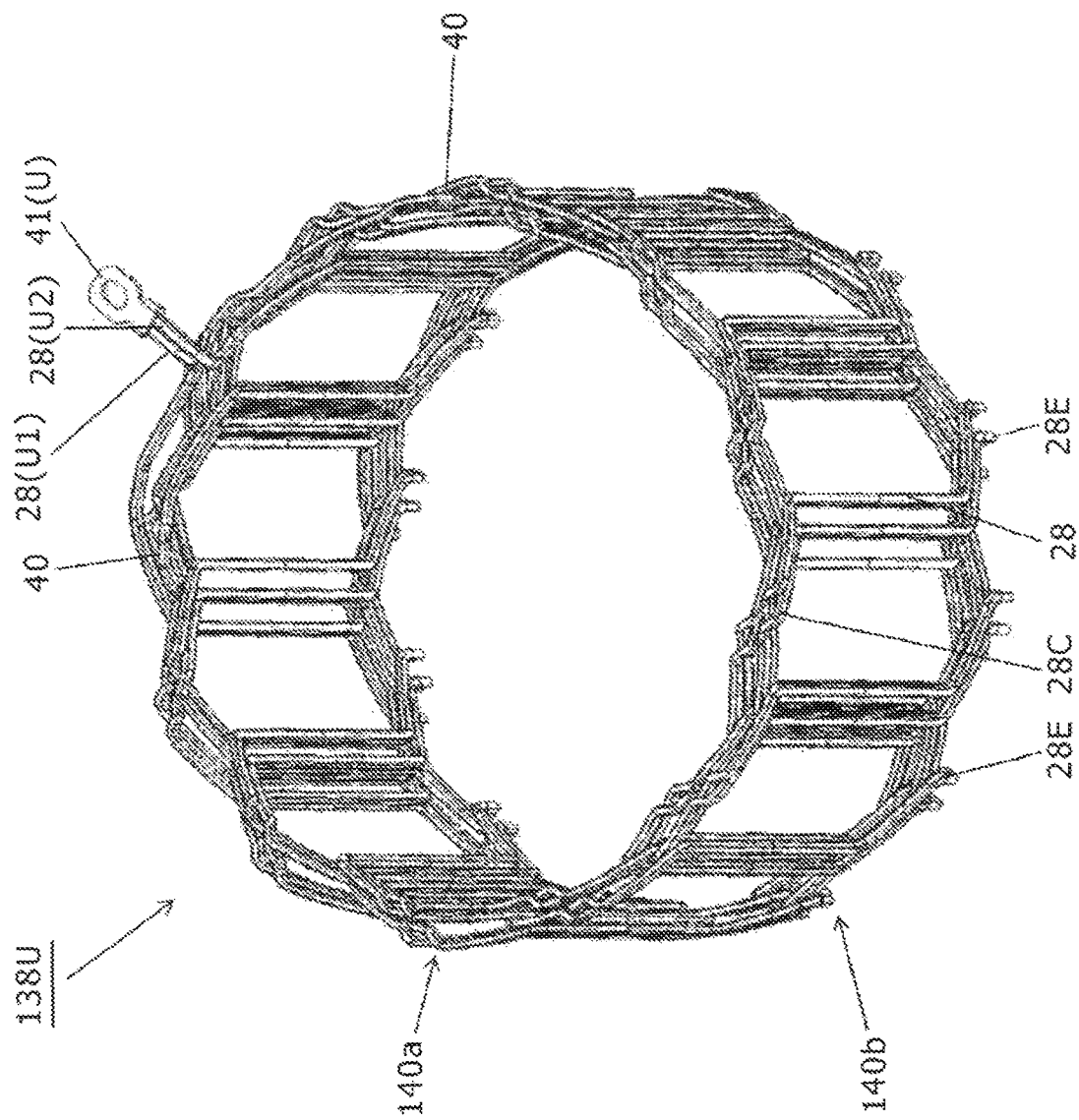
FIG. 8 is a perspective view illustrating a stator coil 138U.
Figure 9:
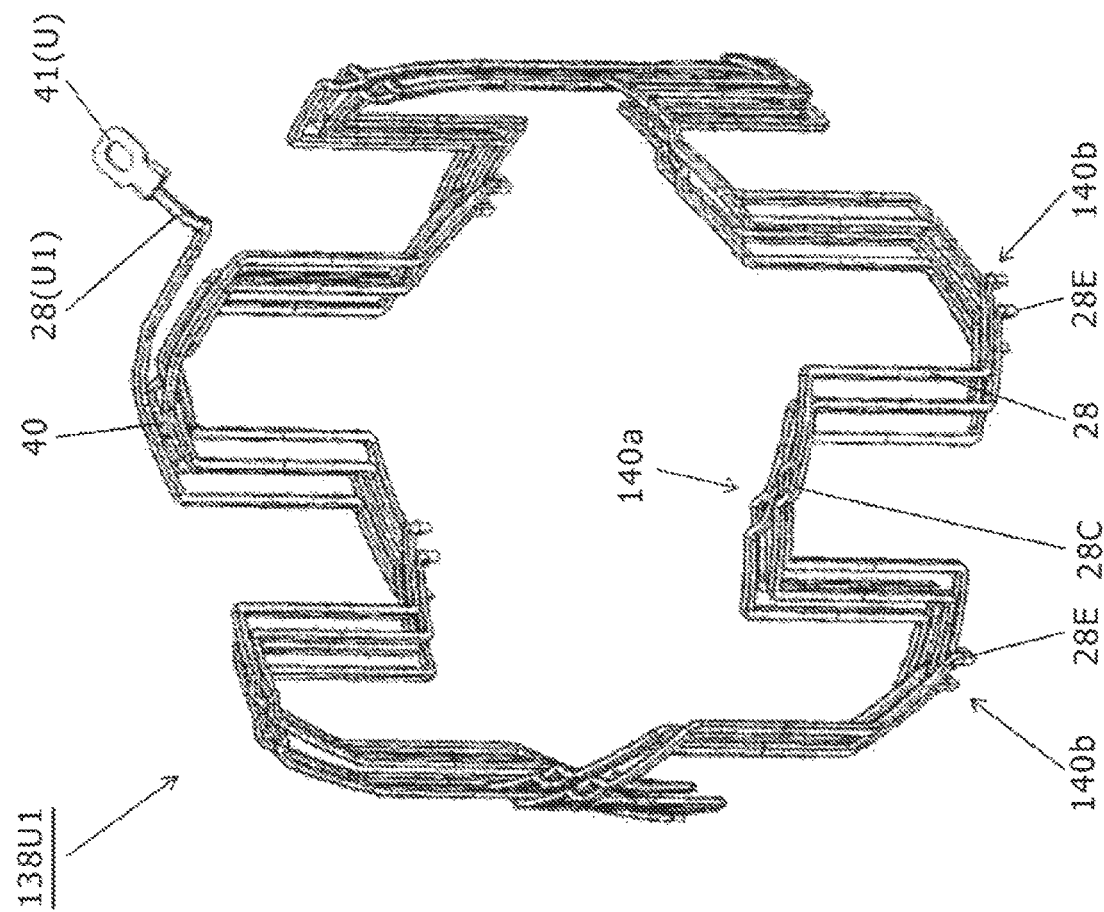
FIG. 9 is a perspective view illustrating a stator coil 138U1.
Figure 10:
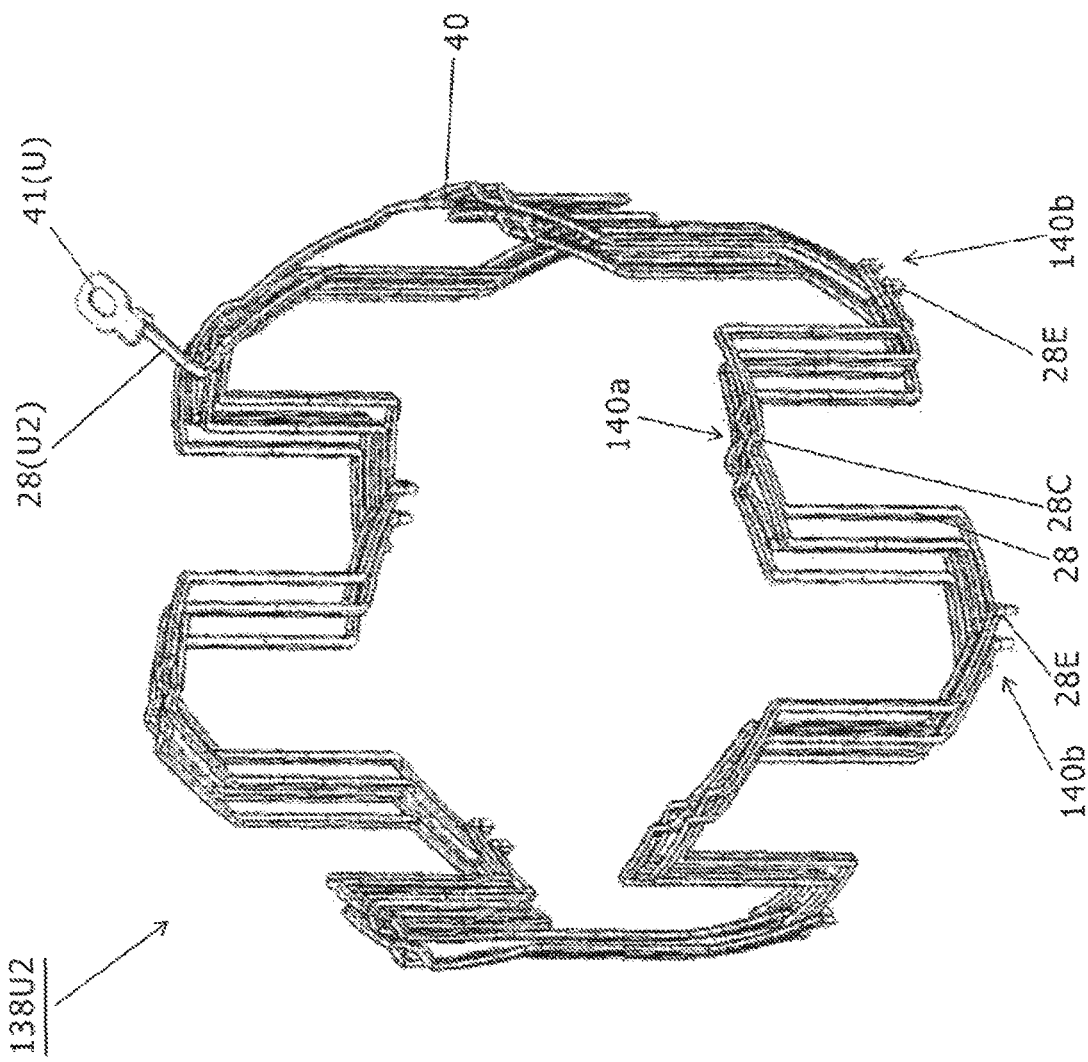
FIG. 10 is a perspective view illustrating a stator coil 138U2.

FIG. 8 is a perspective view of a U-phase stator coil 138U wound around the stator core 132. FIGS. 9 and 10 are perspective views respectively illustrating a U1-phase stator coil 138U1 and a U2-phase stator coil 138U2 which constitute the stator coil 138U. As seen also from FIGS. 9 and 10, the stator coil 138 is a segment-type coil formed by a plurality of U-shaped segment coils 28 being connected together. The segment coil 28 has a top portion 28c disposed at one coil end 140a and both end portions 28E, 28E connected to other associated segment coils 28 at the other coil end 140b.

Figure 11:
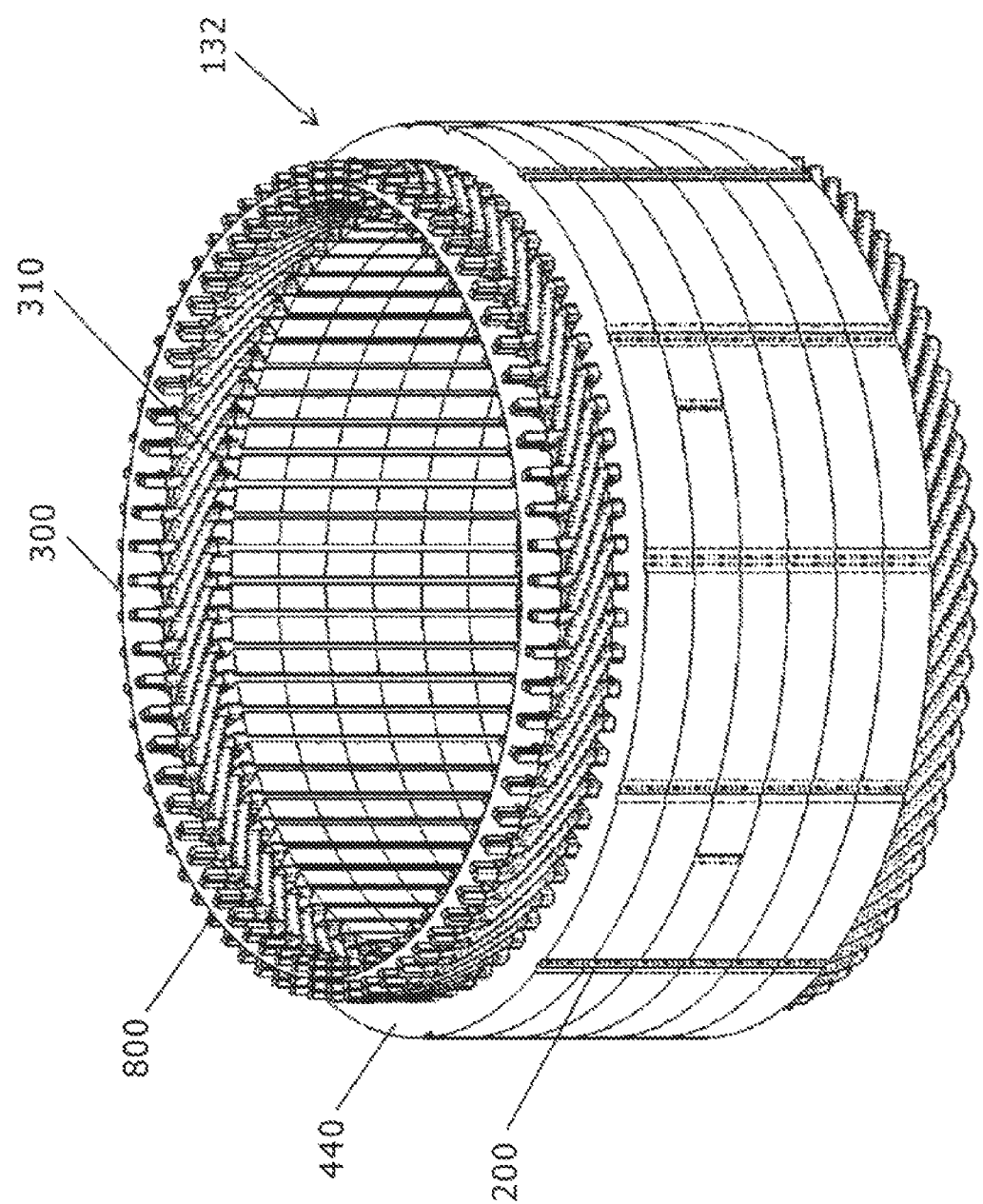
FIG. 11 is an explanatory view of connection portions 800 of segment coils.

FIG. 11 illustrates connection portions 800 of the segment coils. The present embodiment has connection portions 800 located at 144 places. The connection portions are arranged at mutually appropriate intervals. A connecting method uses TIG welding such as arc welding or plasma welding for connection. The base material of a copper wire is melted for connection. Argon, helium, a mixed gas of argon and helium or the like is used as shield gas.

Figure 12:
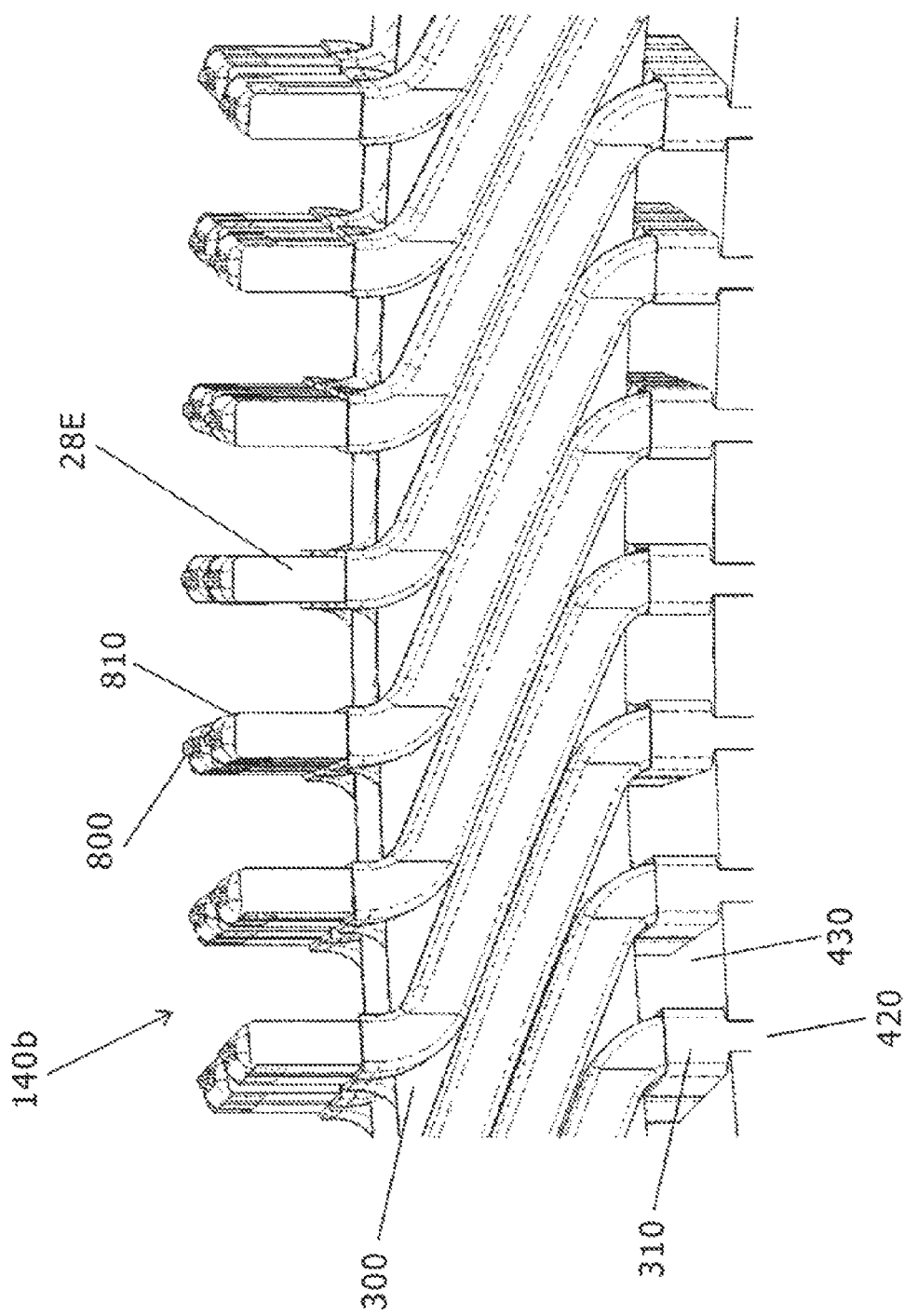
FIG. 12 is an enlarged view illustrating the connection portions 800 of the segment coils illustrated in FIG. 11.

FIG. 12 is an enlarged view of the connection portion 800 of the segment coil illustrated in FIG. 11 as viewed from the radial direction. The connection portion 800 has corner portions 810 left after welding. In particular, aerobic copper has small surface tension; therefore, the corner portions 810 can reduce the size of the coil end 140b.

Figure 13:
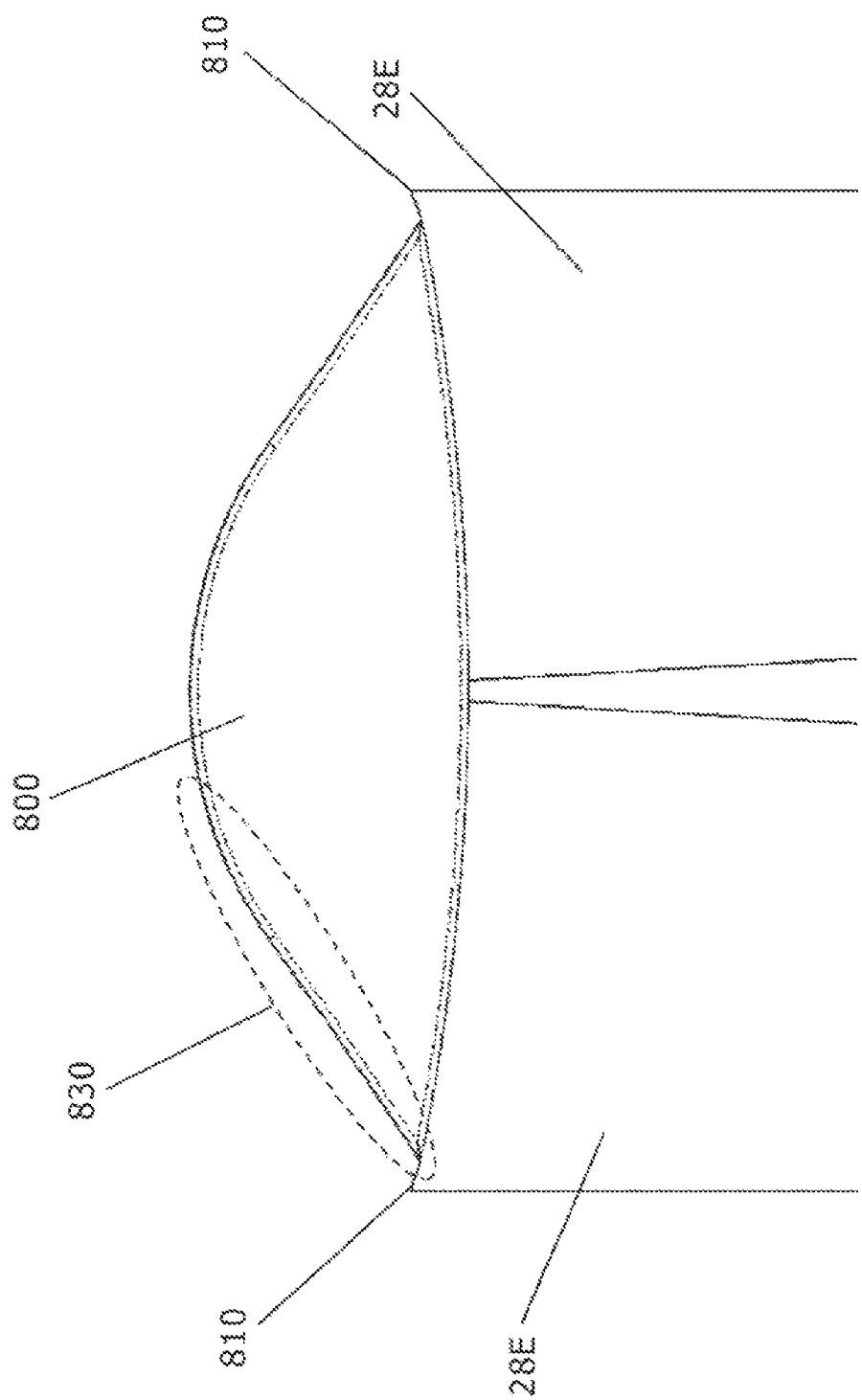
FIG. 13 illustrates a connection portion 800.
Figure 14:
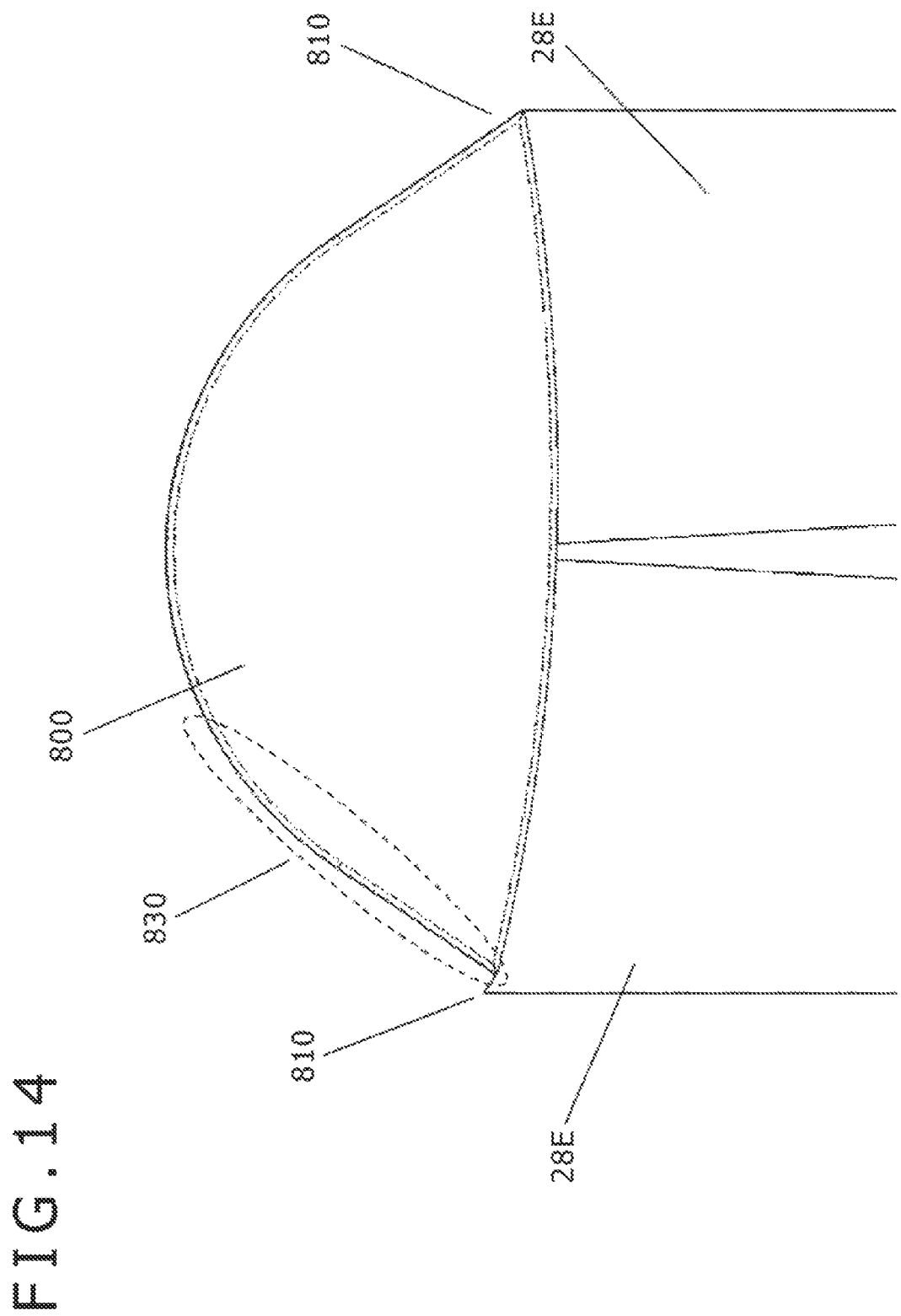
FIG. 14 illustrates the connection portion 800.
Figure 15:
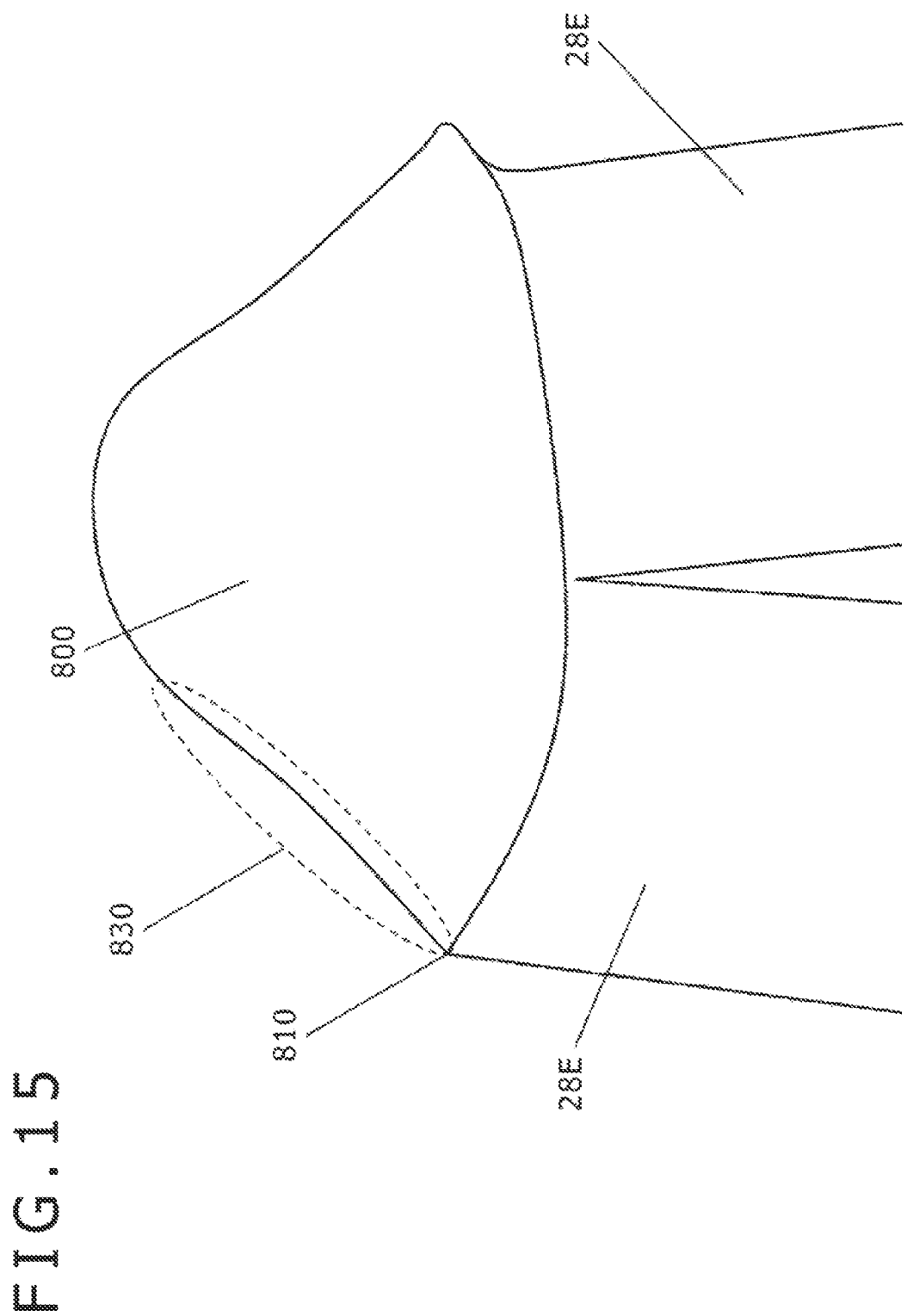
FIG. 15 illustrates the connection portion 800.
Figure 16:
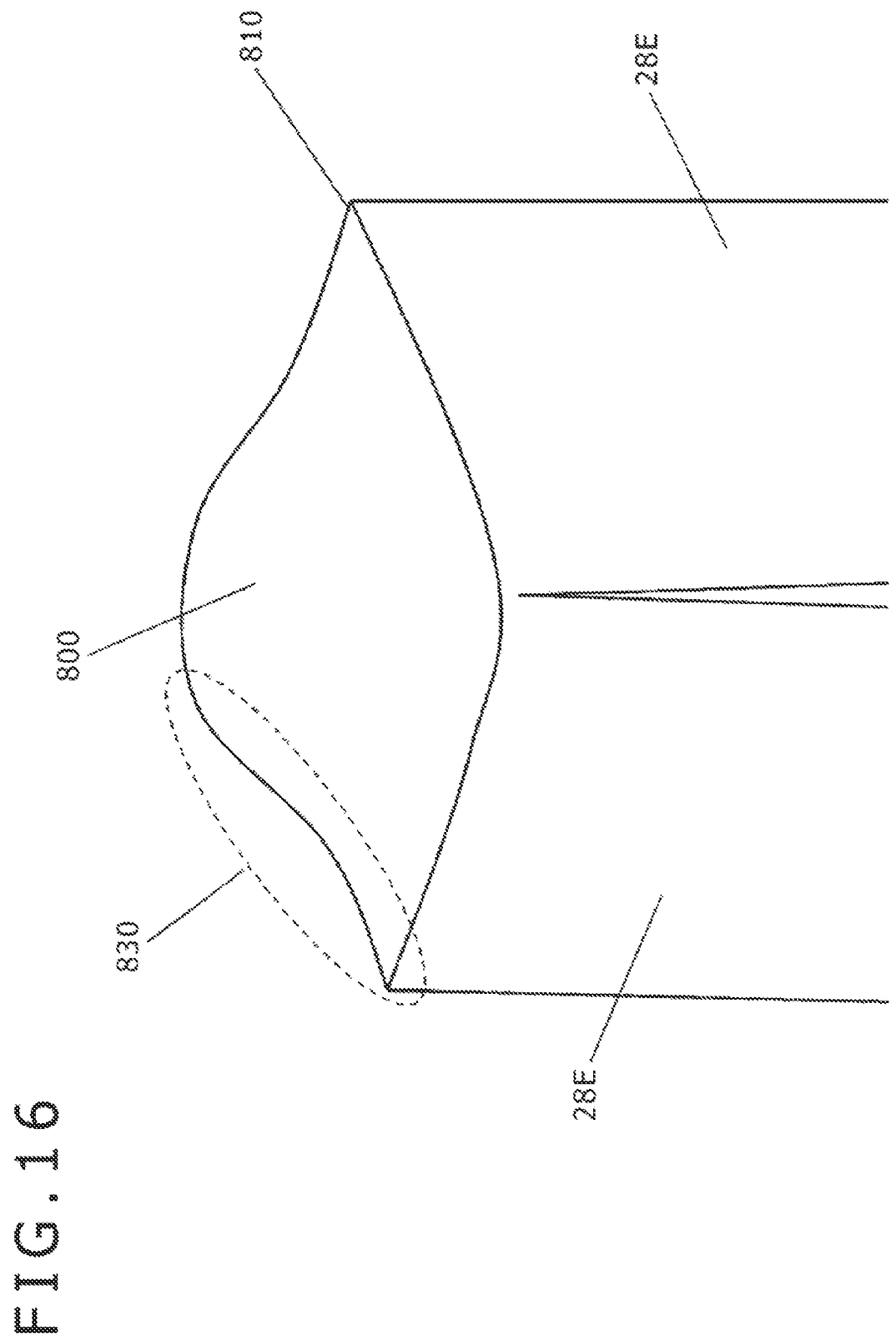
FIG. 16 illustrates the connection portion 800.

FIG. 13 is a detailed view of the connection portion 800 of FIG. 12 as viewed from the circumferential direction thereof (similarly, FIGS. 14 to 16 are drawings as viewed from the circumferential direction as well). In the present embodiment, since the welded portion has small surface tension, the corner portions 810 are formed on both sides of the connection portion in the radial direction. In other words, the welded portion is formed like a mountain leaving the corner portions 810. In the present embodiment, the corner portion 810 is formed to project from a foot 830 of the mountain-shaped welded portion toward the axial direction. Because of such a shape, the coil end 140b can be more reduced in size.

FIG. 14 is a detailed view of another embodiment of the connection portion 800 in FIG. 12. In the present embodiment, a connection area is made large; therefore, a welded portion is large. In other words, the foot 830 of the mountain-shaped welded portion is larger than the example of FIG. 13 and the corner portion 810 is configured to connect with the foot 830 of the mountain-shaped welded portion (the right side in FIG. 14). Also in the present embodiment, since the welded portion has small surface tension, the corner portions 810 are formed on both sides. Thus, the coil end 140b can be further reduced in size. It should be noted that, to make the connection area large, the coil end 140b only needs to face the downside (the direction of gravitational force) at the time of welding.

FIG. 15 is a detailed view of another embodiment of the connection portion 800 in FIG. 12. In the present embodiment, the connection area is made large; therefore, the welded portion is further larger than that of FIG. 14. More specifically, the connection portion 800 is configured such that a corner portion 810 connects with a foot 830 of a mountain-shaped welded portion on one side of the radial direction. In addition, the welded portion projects outward in the radial direction of a base material on the other side of the radial direction. However, to produce the advantages of the present embodiment, the corner portion 810 needs to be formed on one side of the radial direction. Moreover, the corner portion 810 may be shaped to project from the foot 830 toward the axial direction as illustrated in FIG. 13.

As described above, in the present embodiment, the welded portion has small surface tension and the corner portion 810 is formed on one side. Therefore, the coil end 140b can be made small. It should be noted that, to make the connection area large, the coil end 140b needs to face the downside (the direction of gravitational force) at the time of welding.

FIG. 16 is a detailed view of another embodiment of the connection portion 800 in FIG. 12. In the present embodiment, the connection portion 800 has corner portions 810 and is configured such that a foot 830 of a mountain-shaped welded portion sags downwards in the axial direction. Because of such a configuration, the axial height of the connection portion 800 can be controlled while the connection area is made large. In this case, the corner portion 810 may be shaped so as to project in the axial direction as in FIG. 13. Alternatively, the corner portion 810 may be shaped to connect with the foot 830 of the mountain-shaped welded portion. However, if the corner portion 810 is shaped to connect with the foot 803, the connection area will be larger. As described above, in the present embodiment, the welded portion has small surface tension and the corner portions 810 are formed for this reason. Thus, the coil end 140b can be made small. It should be noted that, to make the connection area large, the coil end 140b needs to face the downside (the direction of gravitational force) at the time of welding.

Figure 17:
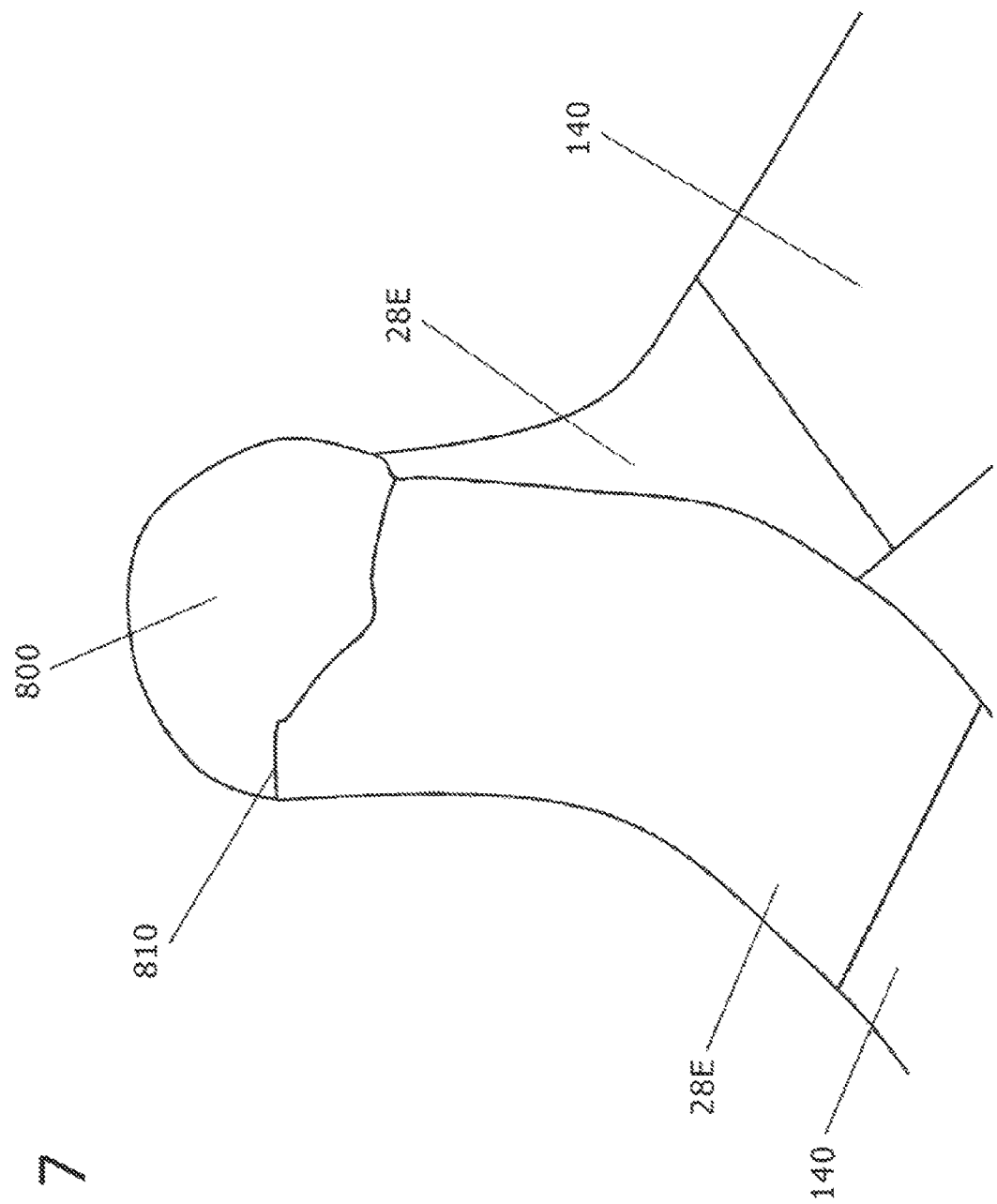
FIG. 17 illustrates the connection portion 800.

FIG. 17 is a detailed view of another embodiment of the connection portion 800 in FIG. 12 as viewed from the radial direction. In the present embodiment, a corner portion 810 is formed at one portion of a radial end face of the connection portion 800. As described above, the connection portion 800 has small surface tension and the corner portion is formed at one portion of the radial end face of the connection portion. Thus, the coil end 140b can be made small.

Figure 18:
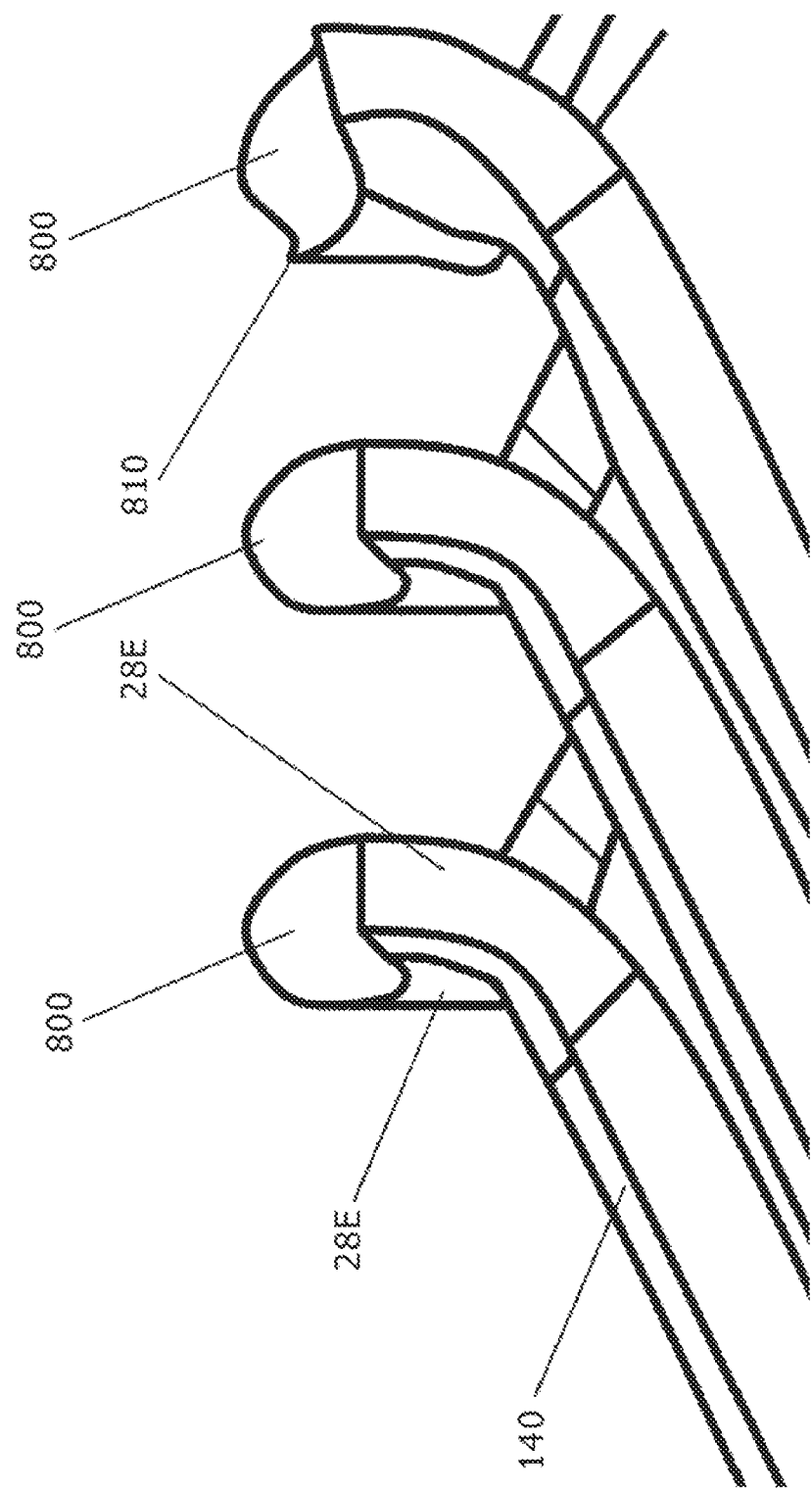
FIG. 18 illustrates the connection portion 800.

FIG. 18 is a detailed view of another embodiment of the connection portion 800 in FIG. 12. In the present embodiment, a connection portion having a corner portion 810 is formed at one portion of the coil end. Also in such an embodiment, the connection portion 800 has small surface tension and therefore the corner portion is formed at one portion of the connection portion. Thus, the coil end 140b can be made small.

It should be noted that the above description is just one example. When interpreted, the present invention is not limited to but not bound by the correspondence relation between the description of the above embodiments and the description of claims. The above embodiments, for example, describe the rotating electric machine whose rotor has the permanent magnets. However, the present invention can similarly be applied to the stator of a rotating electric machine such as an induction motor. The present invention can be also applied to electric rotating machines other than the electric rotating machines for driving vehicles. The configuration of a certain embodiment can partially be replaced with that of another embodiment. In addition, the configuration of one embodiment can be added to that of another embodiment.

DESCRIPTION OF REFERENCE NUMERALS

28: segment coil
28c: top portion
41U, 41V, 41W: AC terminal
100: rotating electric machine
130: stator 132: stator core
138, 138U, 138U1, 138U2: stator coil
140a, 140b: coil end
150: rotor
420: slot
800: connection portion
810: corner portion

The invention claimed is:

1. A rotating electric machine, comprising:
 a stator including a stator core formed with a plurality of slots rowed in a circumferential direction and a stator coil inserted into the slots of the stator core; and
 a rotor disposed rotatably with respect to the stator core with a clearance interposed therebetween,
 wherein the stator coil is formed by a plurality of segment coils being connected, the segment coils being made of a conductor shaped into a rough U-shape and having a rectangular cross-section,
 each of the segment coils has at an end a connection portion welded to another segment coil, and a corner portion disposed between an outer edge of the connection portion and an outer edge of the segment coil, and
 the corner portion projects from a foot of the connection portion in an axial direction of the stator core.

2. The rotating electric machine according to claim 1, wherein the corner portion is formed at radial end portions of the two segment coils sharing the connection portion, and an axial position of the corner portion is closer to the stator than an axial end of the connection portion.

3. The rotating electric machine according to claim 2, wherein the conductor is made of aerobic copper.

4. A method of manufacturing a rotating electric machine, the rotating electric machine including a stator having a stator core formed with a plurality of slots rowed in a circumferential direction and a stator coil inserted into the slots of the stator core, and a rotor disposed rotatably with respect to the stator core with a clearance interposed therebetween, the method comprising the steps of:
 forming a conductor having a rectangular cross-section into a rough U-shape to provide a segment coil; and
 welding together the segment coil and another segment coil in such a manner as to have a connection portion connecting an end of the segment coils, wherein a corner portion of the segment coil disposed between an outer edge of the connection portion and an outer edge of the segment coil, projects from a foot of the connection portion in an axial direction of the stator core.

5. The method according to claim 4,
 wherein the conductor is made of aerobic copper,
 the connecting step is such that the connection portion of the conductor is welded through TIG welding or plasma welding, and
 argon, helium or a mixed gas of argon and helium is used as shield gas for welding.

* * * * *